United States Patent [19]
Sasao et al.
[11] Patent Number: 4,688,312
[45] Date of Patent: Aug. 25, 1987

[54] FUEL INJECTION VALVE HAVING AN END FLANGE FORMED BY PLASTIC WORKING AND ITS METHOD OF MANUFACTURE

[75] Inventors: Isamu Sasao, Kakuda; Yoshiyasu Takaoka, Urawa, both of Japan

[73] Assignee: Honda Giken Kogyo Kabushiki Kaisha, Shibuya, Japan

[21] Appl. No.: 942,297

[22] Filed: Dec. 16, 1986

Related U.S. Application Data

[63] Continuation of Ser. No. 673,498, Nov. 20, 1984, abandoned.

[30] Foreign Application Priority Data

Nov. 30, 1983 [JP] Japan ................................ 58-183701

[51] Int. Cl.[4] ...................... B21D 53/00; B21K 29/00; B23P 15/26

[52] U.S. Cl. ............................ 29/157.1 R; 29/157 C; 72/406; 239/585

[58] Field of Search ........................ 239/533.3–533.12, 239/585; 29/157 C, 283.5, 512, 157.1 R; 72/72, 74, 112, 406, 67, 115

[56] References Cited

U.S. PATENT DOCUMENTS 4,615,098 10/1986 Cone et al. ............................ 29/512

FOREIGN PATENT DOCUMENTS 633857 12/1949 United Kingdom ............ 239/533.5
984577 1/1983 U.S.S.R. ................................ 72/112

OTHER PUBLICATIONS

Maicki, John R. "Orbital Forging", *Metallurgia and Metal Forming,* Jun. 1977, 265–269.

*Primary Examiner*—Andres Kashnikow
*Assistant Examiner*—Mary Beth O. Jones
*Attorney, Agent, or Firm*—Roberts, Spiecens & Cohen

[57] ABSTRACT

A fuel injection valve comprising a main fuel injection valve body having an inlet opening for fuel and a port for discharge of fuel, a fixed core in the valve body, an electromagnetic coil in the valve body, a movable core attracted magnetically towards the fixed core by the coil and a valve member coupled to the movable core for opening and closing the fuel discharge port. A socket portion is on the valve body to define an end portion for supply of fuel to the inlet opening and the socket portion includes an end flange formed by plastic deformation of the socket portion to dispose the flange radially on the socket portion and provide a radial swarf-free surface on the flange capable of sealed engagement with a connection member having a fuel passage connectible with the fuel inlet. The plastic deformation is achieved by rotating a tool on the edge of the initially straight socket portion to bend an edge portion of the socket portion to form the end flange.

2 Claims, 2 Drawing Figures

FUEL INJECTION VALVE HAVING AN END FLANGE FORMED BY PLASTIC WORKING AND ITS METHOD OF MANUFACTURE

This is a continuation on application Ser. No. 673,498 filed 1/20/84, now abandoned.

FIELD OF THE INVENTION

This invention relates to a fuel injection valve which comprises a main fuel injection valve body, a movable core attracted magnetically towards a fixed core by an electromagnetic coil disposed within the main valve body, a valve body coupled to the movable core for opening and closing a fuel discharge port in the main valve body, and a socket portion at one end of the main valve body defining an inlet of a fuel passage communicating with the fuel discharge port, said socket portion including a flange portion adapted for being fitted against a connection member provided with a fuel supply passage.

BACKGROUND

In a fuel injection valve of this type, a seal means for preventing fuel leakage must be provided at the joint between the connection member and the socket portion. It is customary practice to form a groove from an O-ring around the outer circumference of the socket portion, or to form an expanded portion around the outer circumference of the socket portion to ensure a wide seal area for the joint surface. However, such a groove or expanded portion is generally formed by cutting into the socket portion, and the swarf i.e. dust and particles from the cutting can adhere to the fuel passage, so that cleaning must be effected to remove the swarf. Particularly, in a fuel injection valve of this type, fuel is supplied under high pressure into the fuel passage, so that if swarf adheres to a portion close to the valve body (including the seat surface of the valve seat) and is deposited on the downstream side of the fuel passage, fuel leakage is likely to develop, as is well known in the art. For this reason, the cleaning must be accurate and thorough, but the workability of this cleaning is not sufficiently high.

SUMMARY OF THE INVENTION

An object of the present invention is to provide a seal surface on the end of the socket portion by forming a flange portion thereon by a plastic working operation which does not generate swarf.

Thus, the present invention provides a fuel injection valve which is simple in construction and yet can ensure sufficient sealing, while being also easy to work.

In accordance with the present invention, the socket portion is initially tubular and the end flange is formed thereon by plastic deformation to dispose the flange radially on the socket portion and provide a radial swarf-free surface on such flange capable of sealed engagement with a connection member having a fuel passage connectible with the fuel inlet of the socket portion.

In further accordance with the invention, the plastic deformation is effected by applying a tool against the edge of the socket portion to produce a force on the socket portion which is inclined with respect to the axis of the socket portion. The tool is rotated around the edge of the socket portion by rotating the tool around the axis of the socket portion.

According to a feature of the invention, the socket portion is secured in a jig and the edge of the socket portion is bent-over radially by the tool to achieve the plastic deformation and form said radial flange, in situ, in said jig.

DETAILED DESCRIPTION

Figure 2:
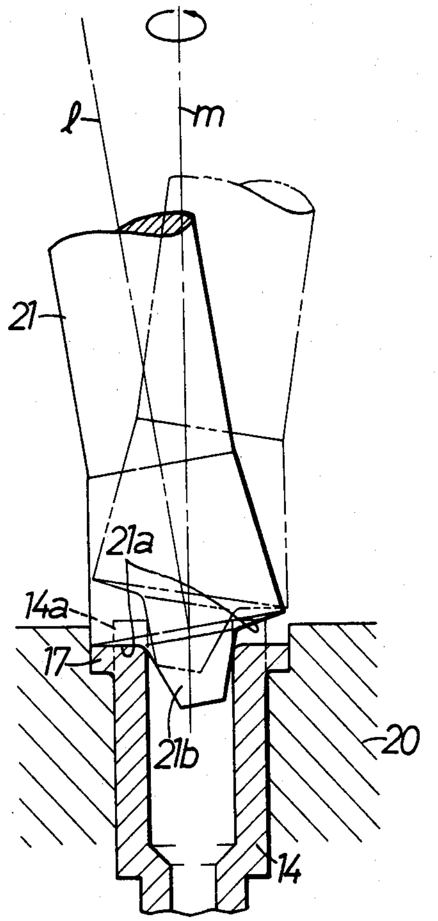
FIG. 2 is a sectional side view of a tool used for plastic working of the flange portion of the fuel injection valve.
Figure 1:
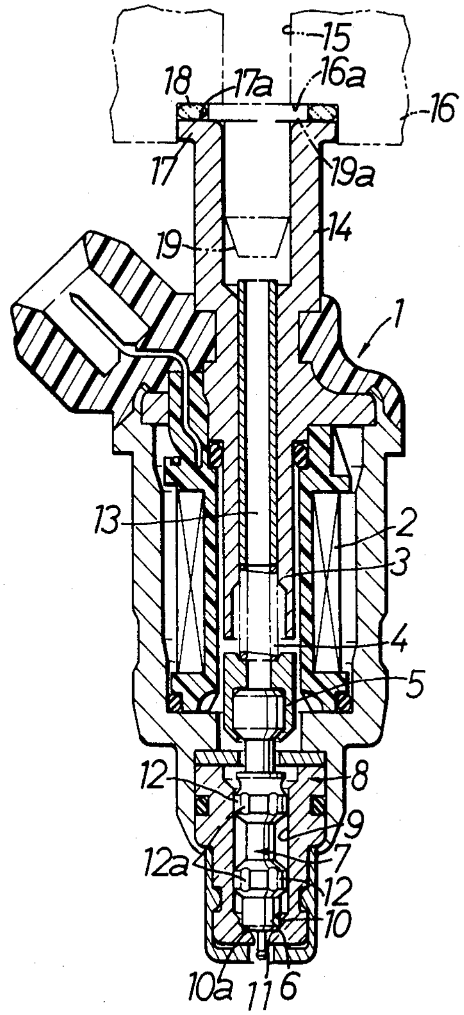
FIG. 1 is a sectional side view of a fuel injection valve in accordance with one embodiment of the present invention.

Referring to FIG. 2, therein is seen a main injection valve body 1 and an electromagnetic coil 2 disposed within the main valve body 1.

A fixed core 3 is provided within the electromagnetic coil 2, and a movable core 5 is also provided within the coil 2, in a forward portion thereof in the axial direction. A spring 4 acts on the movable core 5 to urge the core 5 away from fixed core 3. A valve rod 7 having an end with a valve body 6 is connected to the rear end of the movable core 5 and the valve rod 7 extends into a valve seat-forming member 8 attached to the end of the main valve body 1.

The valve seat-forming member 8 is provided with a guide bore 9 that extends in the axial direction, a valve seat 10 formed at the end of the guide bore 9 in continuation therefrom, and a fuel discharge port 11 in continuation from the valve seat 10. The valve rod 7 extends into the guide bore 9 such that a pair of increased diameter portions 12, which are provided with fuel passage grooves **12*a* along the outer peripheries thereof, can slide along the surface of the guide bore 9, whereby opening and closing displacement movements of the valve rod 7 are guided by the guide bore 9. The valve body 6 at the end of the valve rod 7 is normally pressed into contact with the seat surface 10*a* of the valve seat 10 by the spring 4. When electrical voltage is applied to the electromagnetic coil 2, the movable core 5 is magnetically attracted towards the fixed core 3 against the force of the spring 4, and the movement of the valve rod 7 at this time release the valve body 6 from the seat surface 10*a* opening the fuel discharge port 11** for discharge of fuel therefrom.

Fuel is supplied to the fuel discharge port 11 through a fuel passage 13 within the main fuel injection valve body 1. A socket portion 14 defining the inlet end portion of the fuel passage 13 is provided at the rear end of the main valve body 1. In the embodiment shown in the drawing, an axial hole forming the fuel passage 13 is bored through the fixed core 3, and the fixed core 3 extends outwardly from the rear end of the main valve body 1 so as to form an integral socket portion.

In accordance with the characterizing feature of the present invention, a flange portion 17 which can be attached to a connection member 16, which surrounds a fuel supply passage 15, is formed at the end of the socket portion 14 by plastic working. The surface of the flange portion 17, which faces an opening **16*a* of the connection member 16, is used as a seal surface 17*a*, and an O-ring 18 is inserted between the seal surface 17*a* and the opening 16*a*. A filter 19 is fitted into the socket portion 14 and is clamped by a rear flange portion 19*a*** thereof between the seal surface 17*a* and the opening 16*a*.

Details of the plastic working of the flange portion 17 are shown in FIG. 2. After the socket portion 14 is fixed in a jig 20, a punching tool 21 is inserted into the opening of socket portion 14. The tool 21 has a contact surface 21*a* at its tip which comes into contact with an end portion 14*a* of the socket 14 and a tapered protuberance 21*b* which is inserted into the opening of the socket portion 14. The tool is fitted in the socket portion in such a fashion that the axis l of the tool 21 is at an angle relative to the axis m of the socket portion 14, and so that the tool 21 can rotate freely about the axis l. The tool is driven in rotation about the axis m. The contact surface 21*a* is pressed against the end portion 14*a* and, upon rotational drive of the tool, the contact surface 21*a* is rotated to cause the end portion 14*a* to be worked plastically to form the flange portion 17. As shown in FIG. 2, initially the end portion 14*a* is tubular as illustrated in chain-dotted outline, and the tool 21 deforms the end portion, in situ, by plastic working, to form the flange portion 17 which extends radially. In the course of the deformation of the end portion to form the flange portion, the tool travels axially from its initial position shown in chain-dotted outline in FIG. 2 to the position shown in solid lines. In the embodiment shown in the drawing, the step between the contact surface 21*a* and the protuberance 21*b* is rounded and, at the same time, the inner peripheral edge of the flange portion 17 is also rounded.

The seal surface 17*a* of the flange portion 17 thus formed has a high-precision surface finish which improves the sealing property thereof, and thus does not require a separate surface finish.

As described above, the present invention forms the flange portion 17 by plastic working on the end of the socket portion and the flange portion is adjusted for sealing connection with member 16. Unlike the conventional method of cutting the flange to form the seal portion, the present invention does not require cleaning to effect removal of swarf, and thereby, improves the method of production. Moreover, the present invention ensures a reliable seal although it is simple in construction.

Although the invention has been described in relation to a preferred embodiment thereof, it will become apparent to those skilled in the art that numerous modifications and variations can be made within the scope and spirit of the invention as defined in the attached claims.

What is claimed is:

1. A method for making a fuel injection valve comprising: assembling a main fuel injection valve body having an inlet opening for fuel and a port for discharge of fuel; a fixed core in said valve body; an electromagnetic coil in said valve body; a movable core in said valve body attracted magnetically towards said fixed core by said coil; a valve member coupled to said movable core for opening and closing the fuel discharge port; and a tubular socket portion on said valve body having an axial hollow interior serving as an end fuel passage portion for supply of fuel to said inlet opening, the improvement comprising the steps of placing a contact surface of a tool in abutment against an edge of an end portion of the socket portion while inserting a tapered protuberance on the tool, formed continuously with the contact surface via a rounded step, into the hollow interior of the socket portion, rotating the tool around the axis of the tubular socket portion while the tapered protuberance is guided by and travels on the interior surface of the socket portion thereby plastically deforming said end portion of the socket portion to form a radial flange at the end of the socket portion and provide a radial swarf-free surface on said flange capable of sealed engagement with a connection member having a fuel passage connectible with said fuel inlet opening and further provide, by said rounded step of the tool, a round inner peripheral edge portion which connects between said radial surface and said end fuel passage portion.

2. The method as claimed in claim 1 wherein the socket portion is secured in a jig and the edge of the socket portion is bent-over radially by the tool to achieve said plastic deforming and form said radial flange in situ in said jig.

* * * * *